US007931288B1

(12) United States Patent
Chuang

(10) Patent No.: US 7,931,288 B1

(45) Date of Patent: Apr. 26, 2011

(54) MEDICAL WHEELCHAIR WHOSE SEAT HAVING A HEIGHT ADJUSTABLE FUNCTION

(75) Inventor: Yen-Chi Chuang, Da-An Township, Taichung County (TW)

(73) Assignee: High Spot Health Technology Co., Ltd., Taichung County (TW)

( * ) Notice: Subject to any disclaimer, the term of this patent is extended or adjusted under 35 U.S.C. 154(b) by 0 days.

(21) Appl. No.: 12/715,600

(22) Filed: Mar. 2, 2010

(51) Int. Cl.
*B62M 1/14* (2006.01)

(52) U.S. Cl. ........................ 280/250.1; 280/647; 701/49

(58) Field of Classification Search ............... 280/250.1, 280/304.1, 647, 657; 701/49
See application file for complete search history.

(56) References Cited

U.S. PATENT DOCUMENTS 3,123,400 A * 3/1964 Paulson ........................ 297/314
3,964,786 A * 6/1976 Mashuda ...................... 297/330
4,231,614 A * 11/1980 Shaffer ......................... 297/330
4,773,494 A * 9/1988 Anderson .................... 180/6.48
5,161,812 A * 11/1992 DeWeese ................... 280/47.38
5,375,913 A * 12/1994 Blanchard ..................... 297/330
5,800,016 A * 9/1998 Allred ....................... 297/344.17
6,142,568 A * 11/2000 Abelbeck et al. ......... 297/344.17
6,851,751 B1 * 2/2005 Romero et al. ............... 297/331
7,516,977 B2 * 4/2009 Wu et al. ........................ 280/650
2004/0183276 A1 * 9/2004 Silva ............................. 280/657
2005/0121961 A1 * 6/2005 Beauchesne et al. .......... 297/353
2006/0225212 A1 * 10/2006 Parson et al. ...................... 5/618
2008/0133089 A1 * 6/2008 Bayomy et al. ................. 701/49
2008/0157501 A1 * 7/2008 Moller ........................ 280/250.1
2009/0218784 A1 * 9/2009 Porcheron .................. 280/250.1

* cited by examiner

*Primary Examiner* — Paul N Dickson
*Assistant Examiner* — Tashiana Adams
(74) *Attorney, Agent, or Firm* — Alan Kamrath; Kamrath & Associates PA

(57) ABSTRACT

A medical wheelchair includes a support frame, a front bracket pivotally connected with the support frame, a rear bracket pivotally connected with the support frame, a mounting bracket pivotally connected between the front bracket and the rear bracket, a seat unit mounted on the mounting bracket, and a drive mechanism mounted between the support frame and the mounting bracket to move the mounting bracket and to adjust the height of the seat unit. Thus, the support frame, the mounting bracket, the front bracket and the rear bracket form a parallelogram linkage, so that the mounting bracket is moved smoothly to prevent the seat unit from being vibrated during adjustment of the height of the seat unit. In addition, the drive mechanism provides a buffering effect to the mounting bracket so that the mounting bracket and the seat unit are moved smoothly and stably.

14 Claims, 5 Drawing Sheets

MEDICAL WHEELCHAIR WHOSE SEAT HAVING A HEIGHT ADJUSTABLE FUNCTION

BACKGROUND OF THE INVENTION

1. Field of the Invention

The present invention relates to a wheelchair and, more particularly, to a medical wheelchair for a patient.

2. Description of the Related Art

A conventional medical wheelchair comprises a support frame, a footrest mounted on the front end of the support frame, a backrest mounted on the rear end of the support frame, a seat unit mounted on the support frame and located between the footrest and the backrest, and two wheels mounted on two opposite sides of the support frame. Thus, when the patient is placed on the seat unit, the caretaker can push and move the medical wheelchair freely. However, the seat unit is fixed on the support frame so that the height of the seat unit cannot be adjusted, thereby causing inconvenience to the user when needing to lift or lower the patient.

BRIEF SUMMARY OF THE INVENTION

In accordance with the present invention, there is provided a medical wheelchair, comprising a support frame, a front bracket pivotally connected with the support frame, a rear bracket pivotally connected with the support frame, a mounting bracket pivotally connected between the front bracket and the rear bracket, and a drive mechanism mounted between the support frame and the mounting bracket to drive the mounting bracket to move relative to the support frame.

The support frame includes a bottom bracket and two upright armrest supports mounted on and extended upwardly from the bottom bracket. The bottom bracket of the support frame has two opposite sides each provided with a first pivot portion and a second pivot portion. The bottom bracket of the support frame has a rear end provided with a third pivot portion. The front bracket has two opposite sides each having a lower end provided with a first pivot hole pivotally connected with the respective first pivot portion of the support frame and an upper end provided with a first pivot shaft. The rear bracket has two opposite sides each having a lower end provided with a second pivot hole pivotally connected with the respective second pivot portion of the support frame and an upper end provided with a second pivot shaft. The mounting bracket includes two side rails each pivotally connected between the front bracket and the rear bracket and a crossbeam mounted between the two side rails. Each of the two side rails of the mounting bracket is provided with a first pivot sleeve pivotally connected with the respective first pivot shaft of the front bracket and a second pivot sleeve pivotally connected with the respective second pivot shaft of the rear bracket. The crossbeam of the mounting bracket is provided with a fourth pivot portion. The drive mechanism includes a first portion pivotally connected with the third pivot portion of the support frame and a second portion pivotally connected with the fourth pivot portion of the crossbeam and retractably mounted on the first portion.

The primary objective of the present invention is to provide a medical wheelchair whose seat having a height adjustable function.

According to the primary objective of the present invention, the height of the seat unit can be adjusted freely by operation of the drive mechanism to facilitate a user adjusting the height of the seat unit.

According to another objective of the present invention, the support frame, the mounting bracket, the front bracket and the rear bracket form a parallelogram linkage, so that the mounting bracket is moved smoothly and stably so as to prevent the seat unit from being vibrated or swayed during adjustment of the height of the seat unit.

According to a further objective of the present invention, the drive mechanism is mounted between the support frame and the mounting bracket to provide a buffering effect to the mounting bracket so that the mounting bracket and the seat unit are moved smoothly and stably to provide a comfortable sensation to the patient.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
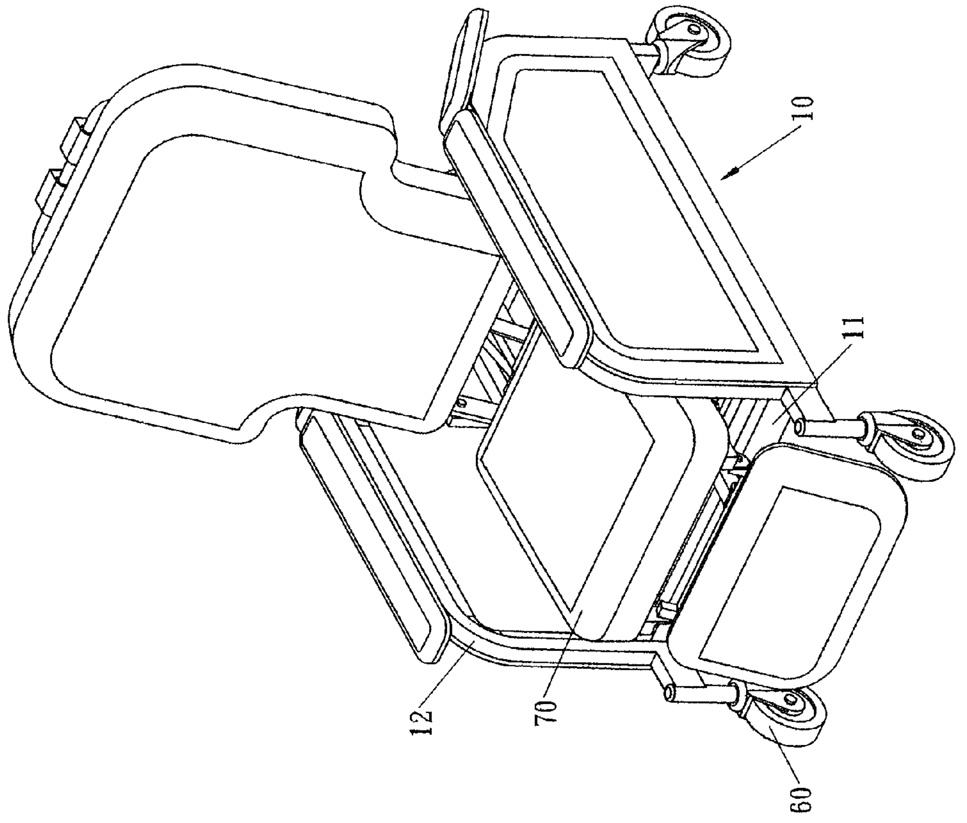
FIG. 1 is a perspective view of a medical wheelchair in accordance with the preferred embodiment of the present invention.

Referring to the drawings and initially to FIGS. 1-4, a medical wheelchair in accordance with the preferred embodiment of the present invention comprises a support frame 10, a front bracket 30 pivotally connected with the support frame 10, a rear bracket 40 pivotally connected with the support frame 10, a mounting bracket 20 pivotally connected between the front bracket 30 and the rear bracket 40, a drive mechanism 50 mounted between the support frame 10 and the mounting bracket 20 to drive the mounting bracket 20 to move relative to the support frame 10, a seat unit 70 mounted on the mounting bracket 20 to move in concert with the mounting bracket 20, and a plurality of rollers 60 rotatably mounted on the support frame 10.

The support frame 10 includes a bottom bracket 11 and two upright armrest supports 12 mounted on and extended upwardly from the bottom bracket 11. The bottom bracket 11 of the support frame 10 has two opposite sides each provided with a first pivot portion 101 and a second pivot portion 102. The bottom bracket 11 of the support frame 10 has a rear end provided with a third pivot portion 103. The second pivot portion 102 of the bottom bracket 11 is located between the first pivot portion 101 and the third pivot portion 103. The rollers 60 are rotatably mounted on the bottom bracket 11 of the support frame 10.

The front bracket 30 has a substantially H-shaped profile. The front bracket 30 has two opposite sides each having a lower end provided with a first pivot hole 302 pivotally connected with the respective first pivot portion 101 of the support frame 10 and an upper end provided with a first pivot shaft 301.

The rear bracket 40 has a substantially inverted U-shaped profile. The rear bracket 40 has two opposite sides each having a lower end provided with a second pivot hole 402 pivotally connected with the respective second pivot portion 102 of the support frame 10 and an upper end provided with a second pivot shaft 401.

The mounting bracket 20 includes two side rails 21 each pivotally connected between the front bracket 30 and the rear bracket 40, a crossbeam 22 mounted between the two side rails 21 and a front beam 23 mounted between the two side rails 21. Each of the two side rails 21 of the mounting bracket 20 is provided with a first pivot sleeve 211 pivotally connected with the respective first pivot shaft 301 of the front bracket 30 and a second pivot sleeve 212 pivotally connected with the respective second pivot shaft 401 of the rear bracket 40. The first pivot sleeve 211 of each of the two side rails 21 is located between the front beam 23 and the crossbeam 22. The crossbeam 22 of the mounting bracket 20 is located between the first pivot sleeve 211 and the second pivot sleeve 212. The crossbeam 22 of the mounting bracket 20 is provided with a fourth pivot portion 221.

The mounting bracket 20 is parallel with the bottom bracket 11 of the support frame 10, and the front bracket 30 is parallel with the rear bracket 40. Thus, the bottom bracket 11 of the support frame 10, the mounting bracket 20, the front bracket 30 and the rear bracket 40 form a parallelogram linkage.

The drive mechanism 50 is a telescopically arranged mechanism and is preferably operated in a hydraulic manner. The drive mechanism 50 includes a first portion 52 pivotally connected with the third pivot portion 103 of the support frame 10 and a second portion 51 pivotally connected with the fourth pivot portion 221 of the crossbeam 22 and retractably mounted on the first portion 52. The second portion 51 of the drive mechanism 50 is movable relative to the first portion 52 of the drive mechanism 50 in a linear manner to drive the mounting bracket 20 to move relative to the support frame 10 so as to adjust the height of the seat unit 70.

Figure 2:
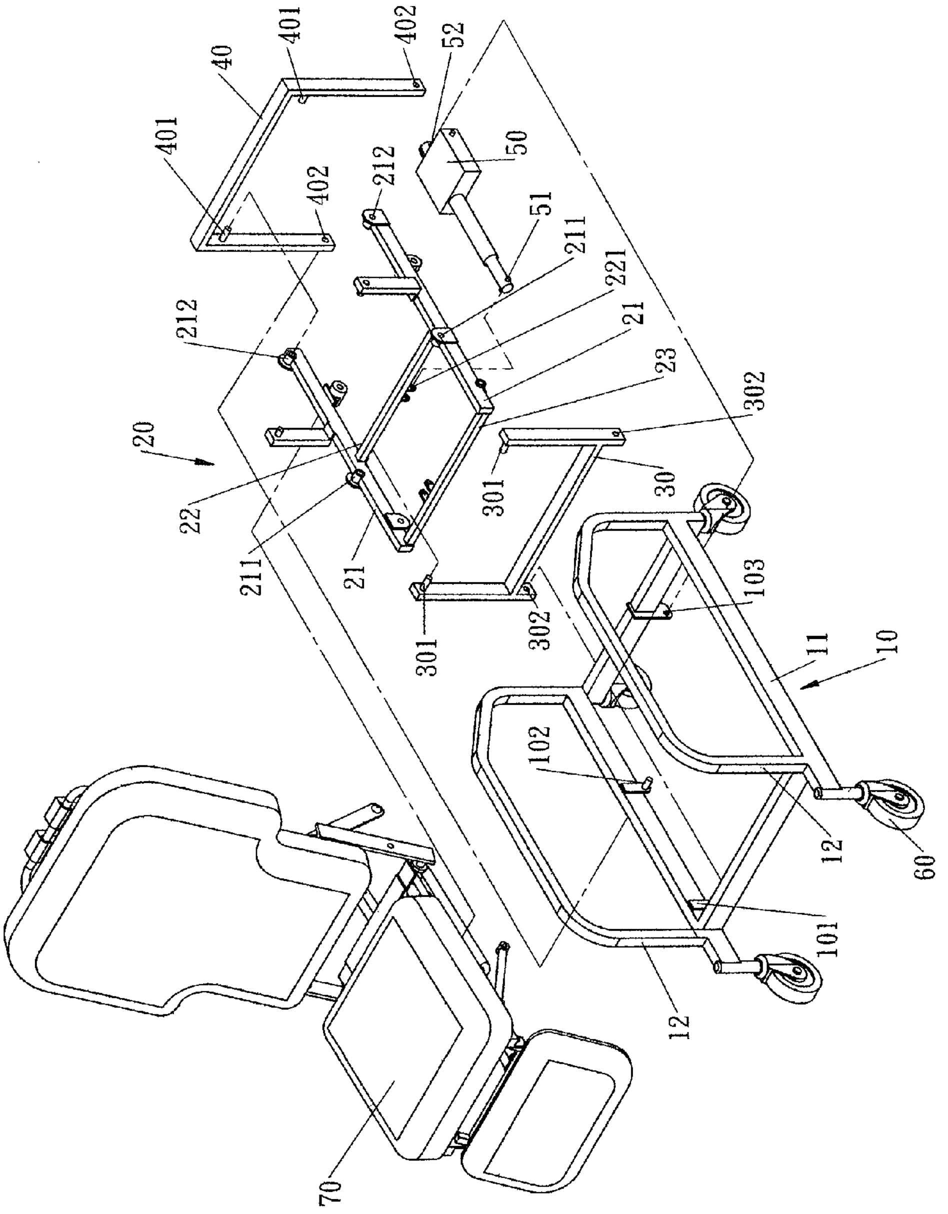
FIG. 2 is an exploded perspective view of the medical wheelchair as shown in FIG. 1.
Figure 3:
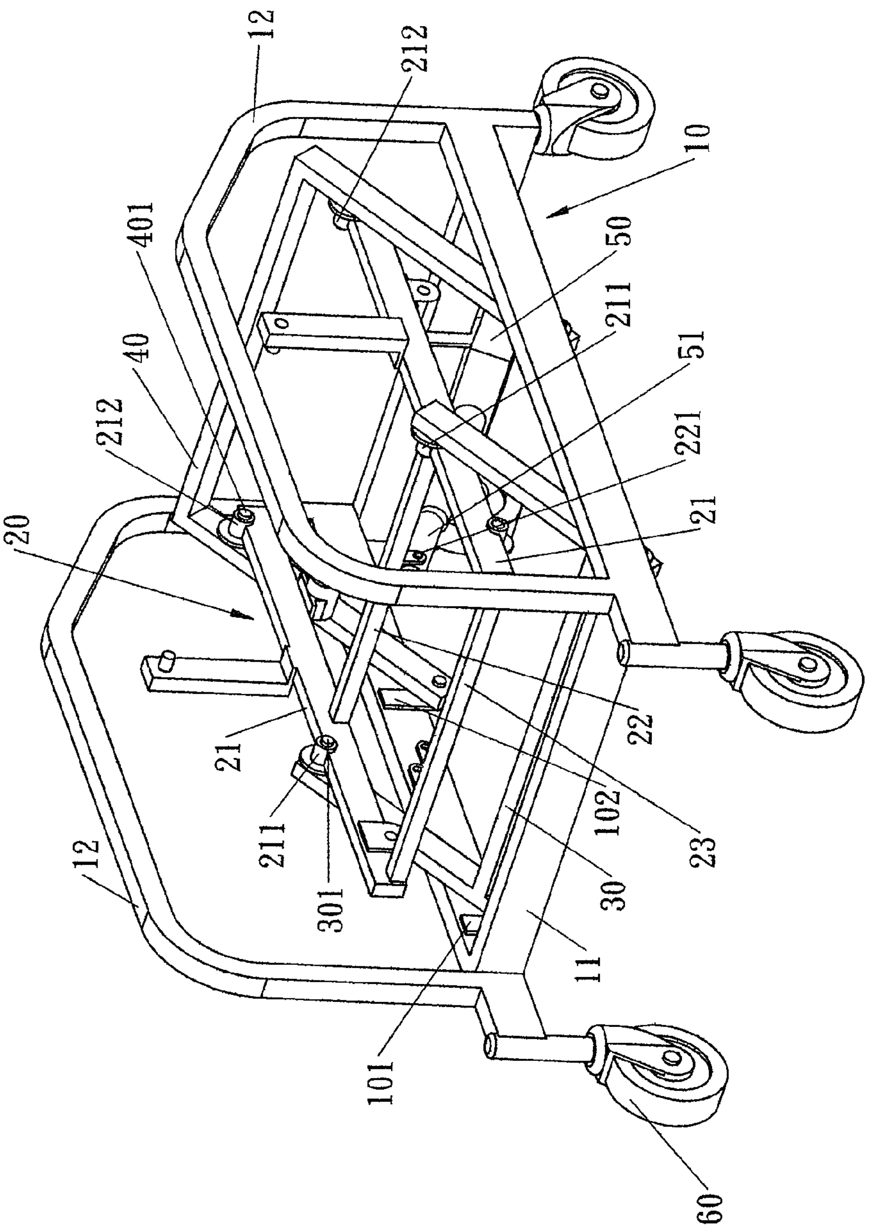
FIG. 3 is a partially perspective view of the medical wheelchair as shown in FIG. 1.
Figure 4:
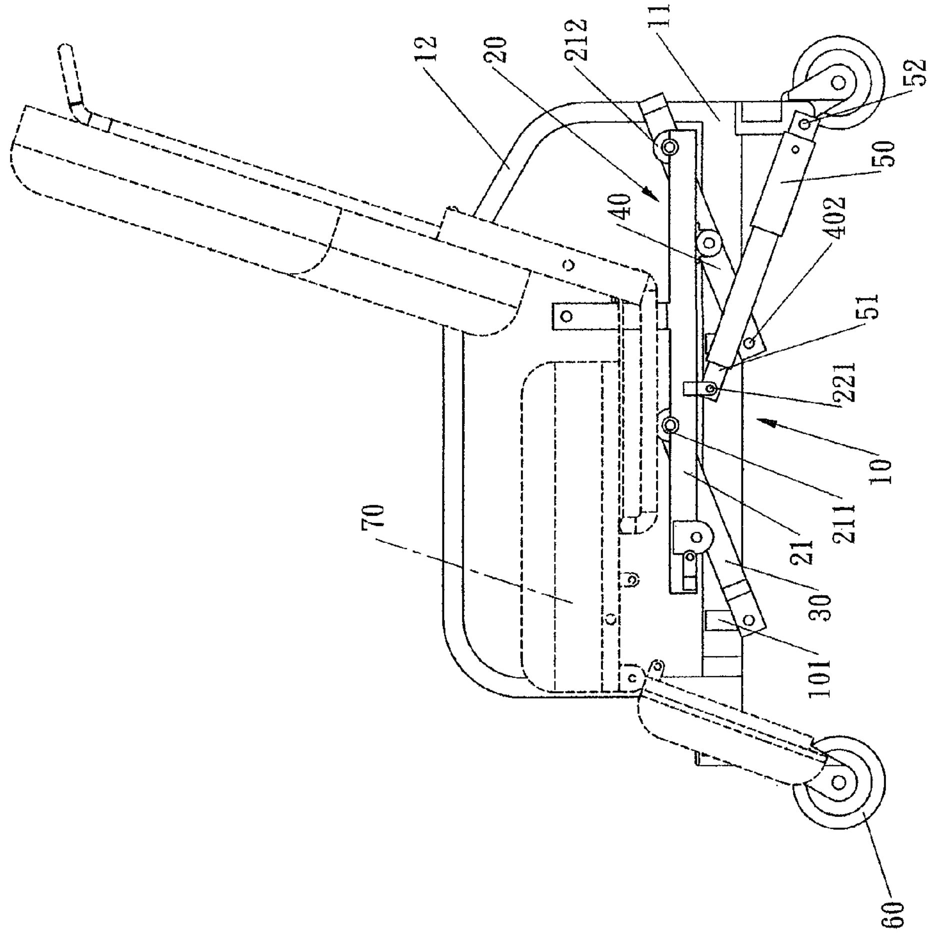
FIG. 4 is a side view of the medical wheelchair as shown in FIG. 1.
Figure 5:
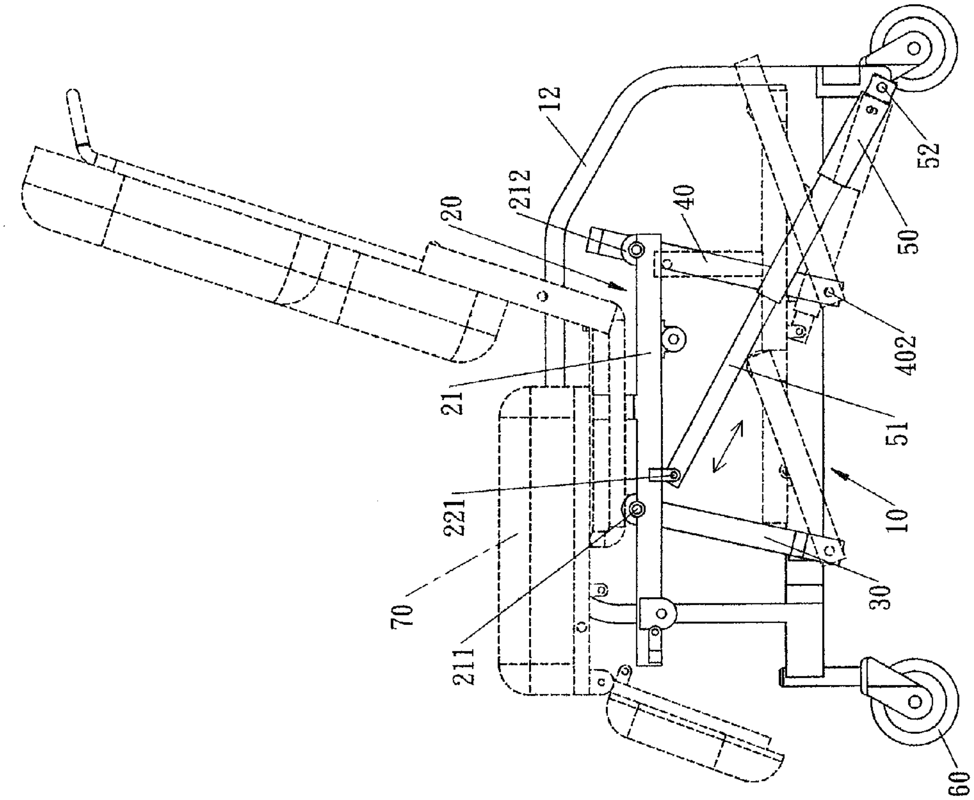
FIG. 5 is a schematic operational view of the medical wheelchair as shown in FIG. 4 in use.

In operation, referring to FIGS. 4 and 5 with reference to FIGS. 1-3, when the drive mechanism 50 is operated and extended, the second portion 51 of the drive mechanism 50 is moved outward relative to the first portion 52 of the drive mechanism 50 to drive the mounting bracket 20 to move outward relative to the support frame 10, so that the mounting bracket 20 is moved upward from the position as shown in FIG. 4 to the position as shown in FIG. 5 to lift the seat unit 70. On the contrary, when the drive mechanism 50 is operated and retracted, the second portion 51 of the drive mechanism 50 is moved toward the first portion 52 of the drive mechanism 50 to drive the mounting bracket 20 to move toward the support frame 10, so that the mounting bracket 20 is moved downward from the position as shown in FIG. 5 to the position as shown in FIG. 4 to lower the seat unit 70. In such a manner, the mounting bracket 20 is moved upward and downward by operation of the drive mechanism 50 to lift and lower the seat unit 70 so that the height of the seat unit 70 can be adjusted freely.

Accordingly, the height of the seat unit 70 can be adjusted freely by operation of the drive mechanism 50 to facilitate a user adjusting the height of the seat unit 70. In addition, the support frame 10, the mounting bracket 20, the front bracket 30 and the rear bracket 40 form a parallelogram linkage, so that the mounting bracket 20 is moved smoothly and stably so as to prevent the seat unit 70 from being vibrated or swayed during adjustment of the height of the seat unit 70. Further, the drive mechanism 50 is mounted between the support frame 10 and the mounting bracket 20 to provide a buffering effect to the mounting bracket 20 so that the mounting bracket 20 and the seat unit 70 are moved smoothly and stably to provide a comfortable sensation to the patient.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A medical wheelchair, comprising:

a support frame;

a front bracket pivotally connected with the support frame;

a rear bracket pivotally connected with the support frame;

a mounting bracket pivotally connected between the front bracket and the rear bracket;

a drive mechanism mounted between the support frame and the mounting bracket to drive the mounting bracket to move relative to the support frame;

wherein the support frame includes a bottom bracket and two upright armrest supports mounted on and extended upwardly from the bottom bracket;

the bottom bracket of the support frame has two opposite sides each provided with a first pivot portion and a second pivot portion;

the bottom bracket of the support frame has a rear end provided with a third pivot portion;

the front bracket has two opposite sides each having a lower end provided with a first pivot hole pivotally connected with the respective first pivot portion of the support frame and an upper end provided with a first pivot shaft;

the rear bracket has two opposite sides each having a lower end provided with a second pivot hole pivotally connected with the respective second pivot portion of the support frame and an upper end provided with a second pivot shaft;

the mounting bracket includes two side rails each pivotally connected between the front bracket and the rear bracket and a crossbeam mounted between the two side rails;

each of the two side rails of the mounting bracket is provided with a first pivot sleeve pivotally connected with the respective first pivot shaft of the front bracket and a second pivot sleeve pivotally connected with the respective second pivot shaft of the rear bracket;

the crossbeam of the mounting bracket is provided with a fourth pivot portion;

the drive mechanism includes a first portion pivotally connected with the third pivot portion of the support frame and a second portion pivotally connected with the fourth pivot portion of the crossbeam and retractably mounted on the first portion.

2. The medical wheelchair of claim 1, wherein the front bracket has a substantially H-shaped profile.

3. The medical wheelchair of claim 1, wherein the rear bracket has a substantially inverted U-shaped profile.

4. The medical wheelchair of claim 1, wherein the mounting bracket further includes a front beam mounted between the two side rails.

5. The medical wheelchair of claim 1, wherein the bottom bracket of the support frame, the mounting bracket, the front bracket and the rear bracket form a parallelogram linkage.

6. The medical wheelchair of claim 5, wherein the mounting bracket is parallel with the bottom bracket of the support frame;

the front bracket is parallel with the rear bracket.

7. The medical wheelchair of claim 1, further comprising:
a seat unit mounted on the mounting bracket to move in concert with the mounting bracket.

8. The medical wheelchair of claim 1, further comprising:
a plurality of rollers rotatably mounted on the support frame.

9. The medical wheelchair of claim 8, wherein the rollers are rotatably mounted on the bottom bracket of the support frame.

10. The medical wheelchair of claim 1, wherein the second portion of the drive mechanism is movable relative to the first portion of the drive mechanism in a linear manner to drive the mounting bracket to move relative to the support frame.

11. The medical wheelchair of claim 1, wherein the second pivot portion of the bottom bracket is located between the first pivot portion and the third pivot portion.

12. The medical wheelchair of claim 4, wherein the first pivot sleeve of each of the two side rails is located between the front beam and the crossbeam.

13. The medical wheelchair of claim 1, wherein the crossbeam of the mounting bracket is located between the first pivot sleeve and the second pivot sleeve.

14. The medical wheelchair of claim 1, wherein the drive mechanism is a telescopically arranged mechanism.

* * * * *